(12) United States Patent
Stahl et al.

(10) Patent No.: US 12,126,059 B2
(45) Date of Patent: Oct. 22, 2024

(54) METHOD FOR PRODUCING A SEALING ELEMENT ON A GAS DIFFUSION LAYER OF AN ELECTROCHEMICAL UNIT

(71) Applicant: ElringKlinger AG, Dettingen (DE)

(72) Inventors: Peter Stahl, Metzingen (DE); Manuel Morcos, Tuebingen (DE)

(73) Assignee: EKPO Fuel Cell Technologies GmbH, Dettingen (DE)

( * ) Notice: Subject to any disclaimer, the term of this patent is extended or adjusted under 35 U.S.C. 154(b) by 885 days.

(21) Appl. No.: 17/139,484

(22) Filed: Dec. 31, 2020

(65) Prior Publication Data

US 2021/0126267 A1 Apr. 29, 2021

Related U.S. Application Data

(63) Continuation of application No. PCT/EP2019/067361, filed on Jun. 28, 2019.

(30) Foreign Application Priority Data

Jul. 2, 2018 (DE) ..................... 10 2018 115 987.0

(51) Int. Cl.
*B29C 45/14* (2006.01)
*H01M 8/0286* (2016.01)
*B29L 31/34* (2006.01)

(52) U.S. Cl.
CPC ..... *H01M 8/0286* (2013.01); *B29C 45/14836* (2013.01); *B29L 2031/3468* (2013.01)

(58) Field of Classification Search
CPC ................................................. B29C 45/14836
See application file for complete search history.

(56) References Cited

U.S. PATENT DOCUMENTS

| 10,183,428 | B2 * | 1/2019 | Jeong ................... H01M 8/1004 |
| 2007/0108657 | A1 | 5/2007 | Ferguson |
| 2009/0023035 | A1 | 1/2009 | Sasaoka |
| 2010/0098989 | A1 | 4/2010 | Morimoto et al. |
| 2016/0359178 | A1 | 12/2016 | Suzuki et al. |
| 2017/0120488 | A1 * | 5/2017 | Hayashi .............. H01M 8/0286 |
| 2017/0173833 | A1 * | 6/2017 | Jeong ................... H01M 8/0273 |
| 2018/0102554 | A1 | 4/2018 | Stahl et al. |

FOREIGN PATENT DOCUMENTS

DE 10 2015 014 679 5/2016
EP 2230708 * 9/2010

* cited by examiner

*Primary Examiner* — Edmund H Lee
(74) *Attorney, Agent, or Firm* — Womble Bond Dickinson (US) LLP

(57) ABSTRACT

A method for producing a sealing element on a gas diffusion layer of an electrochemical unit including the following is provided: arranging an injection molding tool on the gas diffusion layer; and introducing injection molding material into a cavity of the injection molding tool. The injection molding tool includes at least one deformation delimiting element, which delimits or prevents a deformation of the gas diffusion layer during the introduction of the injection molding material into the cavity such that damage to the gas diffusion layer is avoided and a sealing element with a mechanically stable connection region is produced.

12 Claims, 8 Drawing Sheets

METHOD FOR PRODUCING A SEALING ELEMENT ON A GAS DIFFUSION LAYER OF AN ELECTROCHEMICAL UNIT

CROSS-REFERENCE TO RELATED APPLICATIONS

This application is a continuation of international application number PCT/EP2019/067361, filed on Jun. 28, 2019, which claims the benefit of German application number 10 2018 115 987.0, filed on Jul. 2, 2018, which are incorporated herein by reference in their entirety and for all purposes.

FIELD OF DISCLOSURE

The present invention relates to a method for producing a sealing element on a gas diffusion layer of an electrochemical unit.

BACKGROUND OF THE INVENTION

Such an electrochemical unit may form a constituent part of an electrochemical device, which is configured e.g., as a fuel cell device or as an electrolyzer.

The electrochemical device preferably comprises a plurality of electrochemical unit arranged one on top of the other in a stacking direction, as well as preferably two end plates, between which the stack of electrochemical units is arranged and which are braceable against each other by means of a clamping device in order to apply the electrochemical units arranged therebetween and in particular the sealing elements thereof with a clamping force directed along the stacking direction.

In fuel cell devices and in electrolyzers, different media are guided in different planes of an electrochemical unit and, depending on design, in different regions of the same plane. Said media may, in particular, be an anodic fluid (fuel gas), a cathodic fluid (oxidizing agent) and optionally also a fluid cooling agent.

The media to be supplied to the electrochemical device (cathodic fluid, anodic fluid, cooling agent) are supplied to the different planes of the electrochemical device or discharged from the different planes of the electrochemical device by means of a media distribution structure (also called "manifold") with medium supply channels and medium discharge channels, which extend in the stacking direction of the electrochemical device, and must each be supplied from a medium supply channel to the flow field of the respective medium in an electrochemical unit and be discharged from the flow field back into a medium discharge channel. Both the medium supply channels and medium discharge channels as well as the flow fields must thereby be sealed in order to prevent leakage into the outside space of the electrochemical device and between the spaces through which the different media flow.

The media guided through the electrochemical device may neither mix with one another nor exit the electrochemical units, which is why seals are necessary in a plurality of planes.

Said seals may be realized, for example, on the basis of elastomer materials.

In electrochemical units with metallic bipolar plates, the seals can be achieved completely or partially by beads in the bipolar plate or by seals on the basis of elastomer materials.

The bipolar plates (also called separators or interconnectors) may be of one-part configuration or comprise at least two individual layers (bipolar plate layers).

The bipolar plate layers of a multi-layer bipolar plate may be connected together by joining methods like welding or adhesion.

A seal may be inserted as a separate component into the stack of electrochemical units or be fixed to a bipolar plate or to another constituent part of an electrochemical unit, for example to a gas diffusion layer.

If a sealing element is connected directly to a gas diffusion layer, a smooth transition between the seal and the gas diffusion layer is created.

A membrane pressed between two assemblies of in each case a gas diffusion layer and a sealing element is not subjected to excessive voltage peaks.

A cell structure with assemblies of in each case a gas diffusion layer and a sealing element can be constructed very compactly in comparison to a sealing solution with a rim reinforcing arrangement, because no additional space needs to be provided for the overlap between the rim reinforcing arrangement and the membrane electrode arrangement.

The connection of the sealing element to the gas diffusion layer may be effected e.g., in an injection molding process. A gas diffusion layer is thereby placed in a (preferably multi-part) injection molding tool and a sealing material or injection molding material is injection molded around said gas diffusion layer at its outer periphery.

This produces a penetration region at the transition between the gas diffusion layer and the sealing element, in which the injection molding material penetrates a portion of the porous gas diffusion layer.

Said penetration region creates a substance-to-substance and/or positive-locking connection between the gas diffusion layer and the sealing element, such that the gas diffusion layer and the sealing element are mechanically connected to each other sufficiently well during the subsequent assembly steps and during the operation of the electrochemical device.

In the penetration region, the pores of the gas diffusion layer are filled with the injection molding material, which forms the sealing material after curing, such that in this region, the transport of a cathodic fluid or an anodic fluid to the electrochemically active region of the electrochemical unit is impeded. The penetration region should therefore comprise a smallest possible portion of the gas diffusion layer, but should still be large enough to ensure a stable mechanical connection between the gas diffusion layer and the sealing element.

In order to delimit the penetration region on the gas diffusion layer side, the gas diffusion layer, which is mechanically compressible in its thickness direction (in parallel to the stacking direction of the electrochemical device), is locally pressed in an injection molding tool by means of a pressing edge. As a result, the capillary pressure in the pores of the gas diffusion layer rises locally, and the penetration of the gas diffusion layer with the injection molding material is delimited in the x and y directions perpendicular to the thickness direction (z direction).

The pressing edge must press the gas diffusion layer with a minimum pressure to delimit the penetration of the gas diffusion layer with the injection molding material. However, the local pressing of the gas diffusion layer by the pressing edge also may not be too high, as the gas diffusion layer may be damaged upon excessive pressing, for example due to fiber breakage.

The level of penetration of the gas diffusion layer with the injection molding material is dependent on the local pressure, in the respective region of the gas diffusion layer, of the injection molding composition in the injection molding tool.

In addition, the degree of penetration of the gas diffusion layer with the injection molding material depends on the viscosity of the injection molding material, on the temperature of the injection molding material (which influences, among other things, the viscosity of the injection molding material) and on the properties of the gas diffusion layer in the region of the pressing edge and in the remaining region of the gas diffusion layer, in particular on the porosity, on the tortuosity (i.e., on the degree of the twistedness of the transport paths within the gas diffusion layer), on the capillary pressure and on the hydrophobization.

Upon the connection of a sealing element to a gas diffusion layer in an injection molding process or a similar method, injection molding material is introduced at an injection point or at a plurality of injection points into the cavity of the injection molding tool and then spreads along flow paths while forming a flow front in the cavity.

Very high injection pressures arise the cavity of the injection molding tool during the introduction of the injection molding material.

If the injection points for the injection molding material are located outside of the connection region between the sealing element and the gas diffusion layer, the gas diffusion layer may fold over, i.e., deform in this connection region during the filling of the cavity of the injection molding tool with the injection molding material.

As a result of this deformation process, the gas diffusion layer is locally brought out of its typically planar form and is subjected to bending stress.

The gas diffusion layer may be damaged, for example by breaking, as a result of the bending of the gas diffusion layer in the deformed connection region.

In addition, if the gas diffusion layer is severely deformed, the connection region may be mechanically weakened by the gas diffusion layer projecting into the connection region, which is located above the gas diffusion layer in the thickness direction and is also referred to as a connecting lip, and thus prevents the flow of (in particular elastomeric) injection molding material in this region.

It is then not ensured that the cavity of the injection molding tool is completely filled in the region of the connecting lip, thus increasing the risk of mechanical damage to the connection region of the sealing element, in particular due to crack formation.

SUMMARY OF THE INVENTION

In accordance with an embodiment of the invention, a method is provided for producing a sealing element on a gas diffusion layer of an electrochemical unit of the kind stated at the outset, in which damage to the gas diffusion layer is avoided and a sealing element with a mechanically stable connection region is produced.

In accordance with an embodiment of the invention, a method with the features of the preamble of claim 1 is provided in which the injection molding tool comprises at least one deformation delimiting element, which delimits or prevents a deformation of the gas diffusion layer during the introduction of the injection molding material into the cavity.

The concept underlying the invention is to prevent, by providing one or more deformation delimiting elements in the inner space of the cavity of the injection molding tool, that the gas diffusion layer excessively deforms during the introduction of the injection molding material into the cavity of the injection molding tool under the internal pressure of the tool or the injection pressure. It is hereby achieved that the regions of the cavity located outside of the at least one deformation delimiting element are completely filled with the injection molding material. The risk of mechanical damage to the connection region of the sealing element, in particular a crack formation, is hereby reduced.

In addition, damage to the gas diffusion layer caused by a bending stress due to a deformation of the gas diffusion layer is avoided.

In a particular embodiment of the invention, provision is made for the injection molding tool to comprise at least one pressing tool part, which has a pressing projection for pressing the gas diffusion layer.

In particular a pressing edge of the injection molding tool may be arranged on such a pressing projection.

The at least one deformation delimiting element may be formed separate from the pressing tool part and/or separate from other tool parts of the injection molding tool, in particular separate from a supporting tool part.

Alternatively thereto, provision may be made for the at least one deformation delimiting tool to be formed in one piece with a tool part of the injection molding tool, for example in one piece with a pressing tool part.

The deformation delimiting element may be in contact with the pressing projection of the pressing tool part during the introduction of the injection molding material into the cavity of the injection molding tool.

Alternatively thereto, provision may be made for the deformation delimiting element to be at a distance from the pressing projection of the pressing tool part during the introduction of the injection molding material into the cavity of the injection molding tool.

The deformation delimiting element may be arranged above or below a penetration region of the gas diffusion layer in a thickness direction of the gas diffusion layer, said penetration region being penetrated by the injection molding material during the introduction of the injection molding material into the cavity.

The at least one deformation delimiting element may contact the gas diffusion layer before the introduction of the injection molding material into the cavity of the injection molding tool.

In this way, a deformation of the gas diffusion layer due to the application with the injection molding material is avoided to a large extent.

Alternatively thereto, provision may also be made for the deformation delimiting element to be at a distance from the gas diffusion layer before the introduction of the injection molding material into the cavity of the injection molding tool. In this case, a deformation of the gas diffusion layer due to the application with the injection molding material is reduced.

In a particular embodiment of the invention, a plurality of deformation delimiting elements are provided, which are spaced at a distance from each other along a peripheral direction of the gas diffusion layer.

The distance of two deformation delimiting elements following one another in the peripheral direction of the gas diffusion layer may, in particular, be smaller than twice the longitudinal extent of a deformation delimiting element along the peripheral direction, in particular smaller than the longitudinal extent of a deformation delimiting element along the peripheral direction.

Alternatively thereto, provision may be made for only one single deformation delimiting element to be provided, which extends along the peripheral direction of the gas diffusion layer around the gas diffusion layer.

In a particular embodiment of the invention, at least one deformation delimiting element is provided, which has a height that varies along a peripheral direction of the gas diffusion layer and/or the outer rim thereof has a distance from an outside rim of the gas diffusion layer that varies along a peripheral direction of the gas diffusion layer.

The height of the at least one deformation delimiting element may thereby vary e.g., in an undulating manner or linearly in sections.

Further, the distance of the outer rim of the at least one deformation delimiting element from the outside rim of the gas diffusion layer may vary e.g., in an undulating manner or linearly in sections.

An outer rim of the at least one deformation delimiting element remote from the pressing edge of the injection molding tool may be e.g., of undulating configuration or of linear configuration in sections, wherein the linear sections extend at an acute angle to the pressing edge.

In a particular embodiment of the method in accordance with the invention, provision may be made for at least one deformation delimiting element to be arranged on a part of the injection molding tool so as to be moveable relative to the respective part of the injection molding tool and to be moved relative to the respective part of the injection molding tool in order to release the gas diffusion layer and/or the sealing element produced by injection molding from the respective part of the injection molding tool.

The deformation delimiting element may thus be used, in particular, as an ejector for releasing the gas diffusion layer and the sealing element produced thereon from the respective part of the injection molding tool after the injection molding process and preferably after opening the injection molding tool.

The respective part of the injection molding tool may thereby, in particular, be a pressing tool part of the injection molding tool, which has a pressing projection for pressing the gas diffusion layer.

The movement of the deformation delimiting element relative to the respective part of the injection molding tool may be produced e.g., by means of a hydraulic movement device, a pneumatic movement device, and/or an electromotively actuated movement device.

The deformation delimiting element may be coupled to a plunger, which is moved relative to the respective part of the injection molding tool by means of a movement device.

The plunger may thereby have an extent perpendicular to its movement direction, said extent being smaller than or substantially equal to the extent of the deformation delimiting element along the same direction.

The plunger may be displaceably guided on a part of the injection molding tool, in particular on a pressing tool part.

The present invention further relates to an assembly of an electrochemical device, for example a fuel cell device or an electrolyzer, which comprises a gas diffusion layer and a sealing element fixed to the gas diffusion layer, said sealing element comprising a sealing region located outward from an outside rim of the gas diffusion layer and a connection region located inward from the outside rim of the gas diffusion layer.

Underlying the present invention is the further object to create such an assembly, in which damage to the gas diffusion layer during the production of the assembly is avoided and which has a mechanically stable connection region.

This object is achieved in accordance with the invention in an assembly with the features of the preamble of claim 11 in that the connection region is provided with at least one recess at an inside rim of the connection region and/or outward from the inside rim of the connection region.

The respective recess thereby preferably arises by the region of the recess being assumed, during the production of the sealing element on the gas diffusion layer, by a deformation delimiting element that is arranged in the cavity of the injection molding tool.

In particular, provision may therefore be made for the at least one recess to have a shape that corresponds to the shape of a deformation delimiting element used in the production of the sealing element on the gas diffusion layer.

Further features and advantages of the assembly in accordance with the invention have already been described above in conjunction with particular embodiments of the method in accordance with the invention for producing a sealing element on a gas diffusion layer of an electrochemical unit.

The method in accordance with the invention for producing a sealing element on a gas diffusion layer is suited in particular for producing the assembly in accordance with the invention.

An electrochemical device, which contains an assembly in accordance with the invention, may be configured, in particular, as a polymer electrolyte membrane fuel cell device.

In accordance with the present invention, support elements or deformation delimiting elements, which prevent the gas diffusion layer from deforming under the internal pressure of the tool or injection pressure during an injection process of injection molding material, may be introduced in the connection region between a gas diffusion layer and a sealing element in an injection molding tool.

The support elements or deformation delimiting elements may thereby be designed such that support elements or deformation delimiting elements are provided only in regions in the connection region between the gas diffusion layer and the sealing element, such that sealing material that provides for a good mechanical connection of the sealing element to the gas diffusion layer is located between the individual support elements or deformation delimiting elements. Such regions, arranged between the support elements or deformation delimiting elements, of the connecting region of the sealing element are referred to as stabilization regions.

In addition, the support elements or deformation delimiting elements may be designed such that an outside edge of the gas diffusion layer is enclosed across its entire periphery with sealing material.

The support elements or deformation delimiting elements may be designed such that they contact and/or press the gas diffusion layer in the injection molding tool.

In the finished assembly, a region may arise in the connection region between the sealing element and the gas diffusion layer, in which region the connecting lip is interrupted in regions.

The transition between the stabilization region and a recess, in which a support element or deformation delimiting element is arranged upon the production of the sealing element from the injection molding material, may be configured discretely, in a wave shape, in a triangle shape, or in other shapes.

The support elements or deformation delimiting elements may be configured such that they do not contact the gas diffusion layer in the injection molding tool (in particular before the injection molding process), but prevent the gas diffusion layer from folding over too severely in the case of a deformation of the gas diffusion layer during the injection molding process.

The support elements or deformation delimiting elements may be configured such that they project beyond an outside rim of the gas diffusion layer.

The support elements or deformation delimiting elements may be configured such that they do not extend beyond an outside rim of the gas diffusion layer, but rather are arranged completely within the region of the cavity of the injection molding tool that is covered by the gas diffusion layer.

In accordance with the invention, support elements or deformation delimiting elements may be provided in an injection molding tool, which elements prevent a gas diffusion layer from folding over during an injection molding process when a sealing element is connected to one or more porous layers, in particular gas diffusion layers, in an injection molding method.

Further features and advantages of the invention are subject matter of the subsequent description and the graphical representation of exemplary embodiments.

BRIEF DESCRIPTION OF THE DRAWINGS

The same or functionally equivalent elements are provided with the same reference numerals in all Figures.

DETAILED DESCRIPTION OF THE INVENTION

Figure 1:
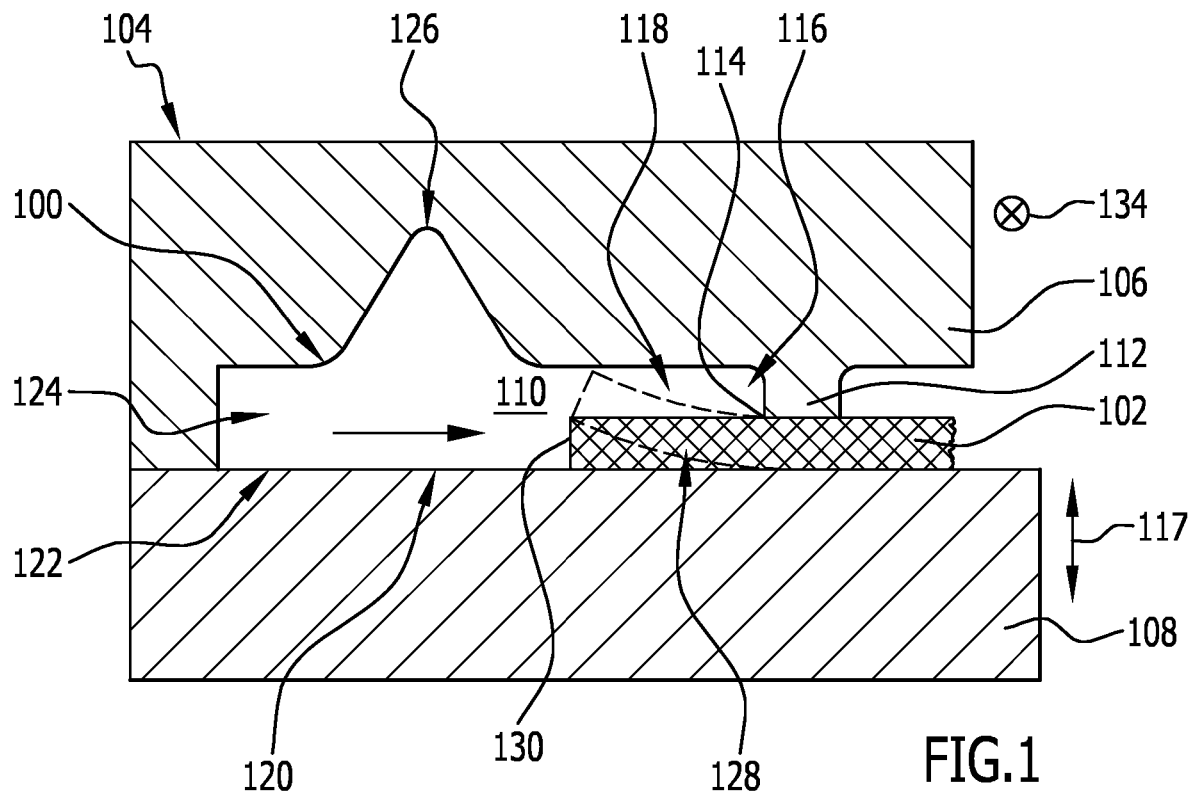
FIG. 1 shows a schematic section through an injection molding tool and a gas diffusion layer projecting into a cavity of the injection molding tool, a deformed state of the gas diffusion layer caused by the introduction of injection molding material into the cavity being depicted in dashed lines.

Depicted in FIG. 1 is a method, not in accordance with the invention, for producing a sealing element 100 on a gas diffusion layer 102 of a membrane electrode arrangement (which is otherwise not depicted) of an electrochemical device (which is not depicted as a whole), for example of a fuel cell device or an electrolyzer.

FIG. 1 shows a multi-part injection molding tool 104, which comprises a pressing tool part 106 and a supporting tool part 108.

The pressing tool part 106 and the supporting tool part 108 together enclose a cavity 110 into which an injection molding material in a flowable state is introduced during the injection molding operation.

The gas diffusion layer 102 projects into said cavity 110.

The pressing tool part 106 has a pressing projection 112, which is provided with a pressing edge 114.

The gas diffusion layer 102 placed in the injection molding tool 104, which is mechanically compressible in its thickness direction 117 (in the assembled state of the electrochemical device in parallel to the stacking direction of the electrochemical device), is pressed locally by means of the pressing edge 114. As a result, the capillary pressure in the pores of the porous gas diffusion layer 102 rises locally, and the penetration of the gas diffusion layer 102 with the injection molding material is delimited in the x and y directions perpendicular to the thickness direction (z direction).

Upon producing the sealing element 100 by means of an injection molding process in the injection molding tool 104, very high injection pressures arise in the cavity 110 of the injection molding tool 104.

If the injection point or the injection points through which the injection molding material is introduced into the cavity 110 are located outside of the connection regions between the sealing element 100 and the gas diffusion layer 102, the gas diffusion layer 102 may fold over, i.e., deform, in said connection regions during the filling of the cavity 110 of the injection molding tool 104 with the injection molding material.

The deformed state caused by the injection molding material introduced into the cavity 110 is depicted in FIG. 1 with dashed lines.

As a result of this deformation process, the gas diffusion layer 102 is locally brought out of its initial planar form and is subjected to bending stress.

The gas diffusion layer 102 may be damaged, for example by breaking, as a result of the bending of the gas diffusion layer 102 in the deformed connection region.

In addition, if the gas diffusion layer 102 is severely deformed, the connection region may be mechanically weakened by the gas diffusion layer 102 projecting into the connection region 116, which is located above the gas diffusion layer 102 in the thickness direction 117 and is also referred to as a connecting lip 118, and thus prevents the flow of (in particular elastomeric) injection molding material in this region.

It is then not ensured that the cavity 110 of the injection molding tool 104 is completely filled in the region of the connecting lip 118, thus increasing the risk of mechanical damage to the connection region 116 of the sealing element 100, in particular due to crack formation.

After the introduction of the injection molding material into the cavity 110 of the injection molding tool 104 and the injection molding material cures to form the sealing material of the sealing element 100, the production of the sealing element 100 on the gas diffusion layer 102 and thus the formation of an assembly 120, which comprises the gas diffusion layer 102 and the sealing element 100 fixed to the gas diffusion layer 102 and is also referred to as a seal-on-GDL unit 122, is complete.

After opening the injection molding tool 104, by removing the pressing tool part 106 from the supporting tool part 108, the assembly 120 can be used in assembling the membrane electrode arrangement and the mounting of the electrochemical device.

The sealing element 100 of the finished assembly 120 comprises a sealing region 124 with a sealing lip 126, a penetration region 128, in which the injection molding material has penetrated into the porous material of the gas diffusion layer 102 and which extends from an outside rim 130 of the gas diffusion layer 102 inward into the region of the pressing edge 114, and a connection region 116 in the form of a connecting lip 118, located outside of the gas diffusion layer 102, above and/or below the gas diffusion layer 102 in the thickness direction 117.

Figure 2:
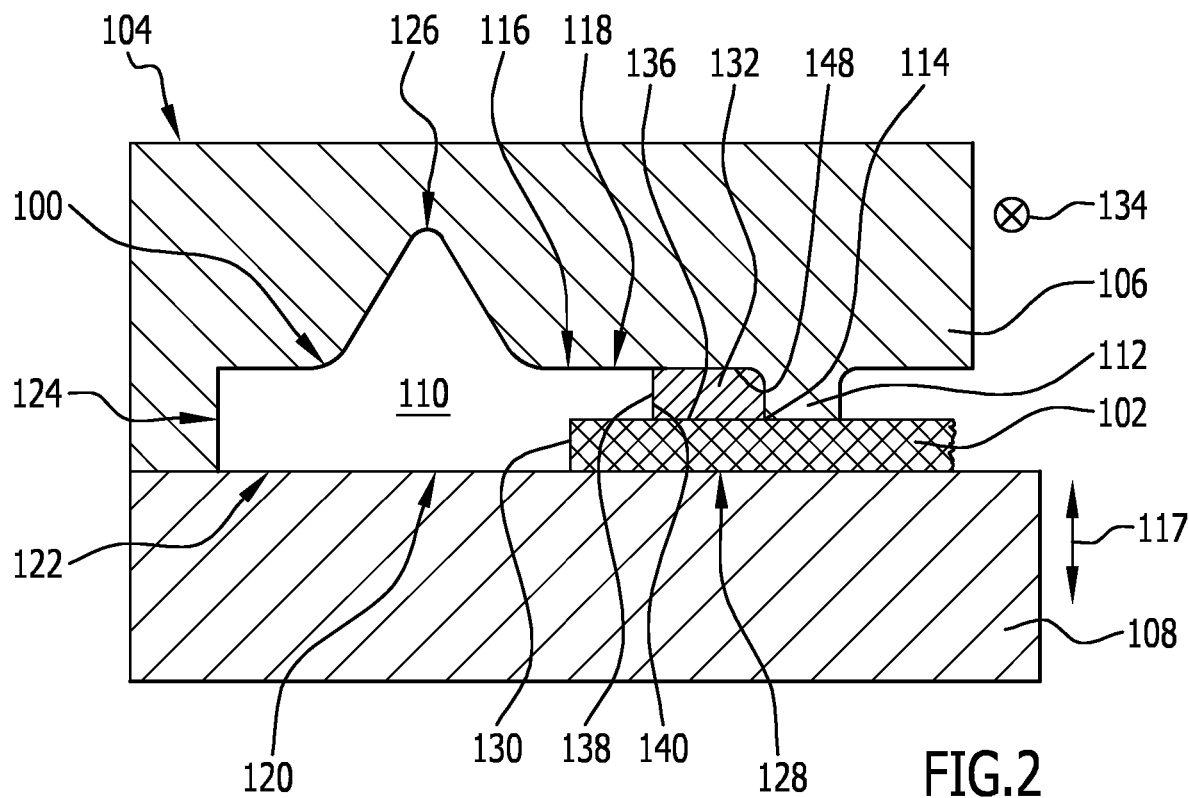
FIG. 2 shows a schematic section through an injection molding tool that has a plurality of deformation delimiting elements spaced at a distance from each other in a peripheral direction of the gas diffusion layer, said deformation delimiting elements contacting the gas diffusion layer before the introduction of the injection molding material into the cavity of the injection molding tool and being in contact with a pressing projection of a pressing tool part of the injection molding tool.

In the method in accordance with the invention for producing the sealing element 110 on the gas diffusion layer 102, which method is schematically depicted in FIG. 2, a plurality of deformation delimiting elements 132 are provided in the cavity 110 of the injection molding tool 104, which are spaced at a distance from each other in a peripheral direction 134 of the gas diffusion layer 102 oriented in parallel to the outside rim 130 of the gas diffusion layer 102 and in parallel to the pressing edge 114 of the pressing tool part 106.

In the depicted embodiment, the deformation delimiting elements 132 are formed separate from the pressing tool part 106 and separate from the supporting tool part 108 of the injection molding tool 104.

The deformation delimiting elements 132 may in principle also be formed in one piece with another constituent part of the injection molding tool 104, for example with the pressing tool part 106 or with the supporting tool part 108.

In the embodiment in accordance with FIG. 2, the deformation delimiting elements 132 are in contact with the pressing projection 112 of the pressing tool part 106.

Further, the deformation delimiting elements 132 already contact the gas diffusion layer 102 on its main face 136 facing toward the pressing edge 114 before the introduction of the injection molding material into the cavity 110 of the injection molding tool 104.

An outer rim 138 of each deformation delimiting element 132, which is remote from the pressing edge 114, is arranged between the outside rim 130 of the gas diffusion layer 102 on the one hand and the pressing edge 114 of the injection molding tool 104 on the other hand, such that the deformation delimiting elements 132 do not completely cover the region of the gas diffusion layer 102 the projects into the cavity 110 of the injection molding tool 104.

The deformation delimiting elements 132 arranged in the injection molding tool 104 in the connection region between the gas diffusion layer 102 and the sealing element 100 prevent the gas diffusion layer 102 from deforming during the introduction of the injection molding material into the cavity 110 of the injection molding tool 104 under the occurring internal pressure of the tool or injection pressure, as is depicted in FIG. 1.

It is hereby achieved that the regions of the cavity 110 located outside of the deformation delimiting elements 132 are completely filled with the injection molding material. The risk of mechanical damage to the connection region 116 of the sealing element 100, in particular a crack formation, is hereby reduced.

In addition, damage to the gas diffusion layer 102 caused by a bending stress due to a deformation of the gas diffusion layer 102 is avoided.

Figure 3:
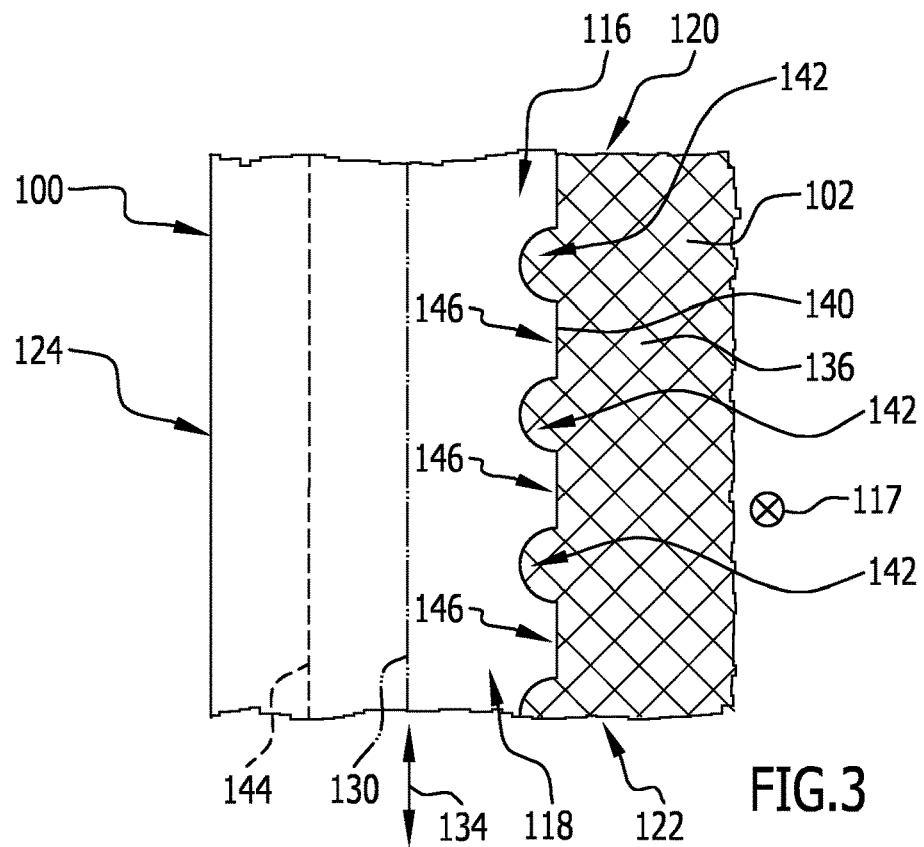
FIG. 3 shows a sectional plan view from above of an assembly of the gas diffusion layer and a sealing element fixed to the gas diffusion layer, said sealing element having been produced by means of the injection molding tool from FIG. 2.

As can be seen in FIG. 3, which depicted a sectional plan view of the finished assembly 120 of gas diffusion layer 102 and sealing element 100, removed from the injection molding tool 104, the connection region 116 of the sealing element 100, due to the presence of the deformation delimiting elements 132 in the cavity 110 of the injection molding tool 104, is provided with recesses 142 on an inside rim 140 of the same, said recesses being arranged at those locations at which the deformation delimiting elements 132 were arranged while the gas diffusion layer 102 was placed in the injection molding tool 104.

As can be seen in FIG. 3, provision may be made e.g., for the deformation delimiting elements 132 to have a circle segment-shaped, in particular semicircular, cross section, taken perpendicular to the thickness direction 117 of the gas diffusion layer 102.

Arranged between the recesses 142 in the connection region 116 of the sealing element 100 are stabilization regions 146, in which the sealing element 100 has a greater material thickness than in the region of the recesses 142, such that the stabilization regions 146 provide for a mechanical connection of the sealing element 100 to the gas diffusion layer 102.

The position of the outside rim 130 of the gas diffusion layer 102 is indicated in FIG. 3 by the dashed-double point line 130.

The position of the rounded tip of the sealing lip 126 of the sealing element 100 is indicated in FIG. 3 by means of the broken line 144.

Figure 4:
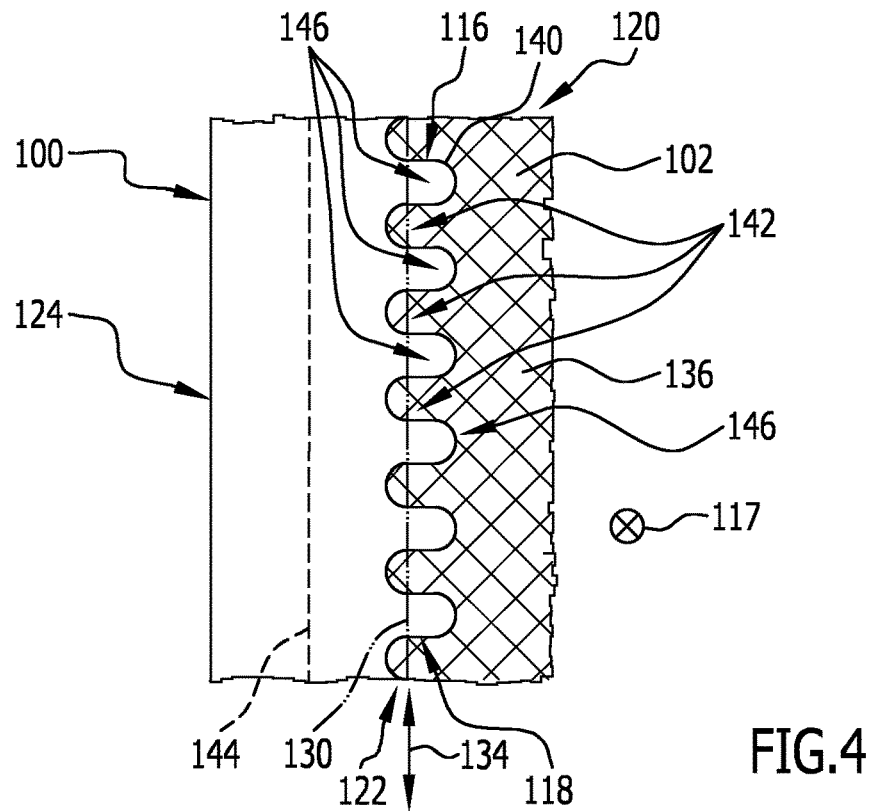
FIG. 4 shows a sectional plan view of an alternative assembly of a gas diffusion layer and a sealing element, which sealing element has been produced by means of a deformation delimiting element, the outer rim of which has a distance from an outside rim of the gas diffusion layer that varies in an undulating manner along the peripheral direction of the gas diffusion layer.

The alternative assembly 120 of a gas diffusion layer 102 and a sealing element 100, shown in FIG. 4 in a sectional plan view, has been produced by means of an injection molding tool 104, which, instead of a plurality of deformation delimiting elements 132 spaced at a distance from each other along the peripheral direction 134 of the gas diffusion layer 102, comprises a deformation delimiting element 132 that has an wave-shaped outer rim 138 and thus a distance from the outside rim 130 of the gas diffusion layer 102 that varies in an undulating manner along the peripheral direction 134 of the gas diffusion layer 102.

Located between the recesses 142 are stabilization regions 146 in which the cured injection molded material of the sealing element 100 provides for a good mechanical connection of the sealing element 100 to the gas diffusion layer 102.

The outside rim of the gas diffusion layer 102 is enclosed with sealing material, i.e., with cured injection molding material, across the entire periphery of the gas diffusion layer 102.

The connection region 116 of the sealing element 100 produced in that way comprises a likewise wave-shaped inside rim 140, which is formed complementarily to the outer rim of the deformation delimiting element 132.

In addition, in this embodiment of the production method, the wave-shaped deformation delimiting element 132 extends, at least in sections, outward across the outside rim 130 of the gas diffusion layer 102, such that in the finished assembly 120, the outside rim 130 of the gas diffusion layer 102 intersects the inside rim 140 of the connection region 116 of the sealing element 100, seen along the thickness direction 117 of the gas diffusion layer 102.

Because the deformation delimiting element 132 does not extend into the plane of the gas diffusion layer 102 and the sealing region 124 of the sealing element 100 directly adjoins the penetration region 128, the sealing element 100 still does not have any through-holes in the regions in which the inside rim 140 of the connection region 116 extends outward from the outside rim 130 of the gas diffusion layer 102.

Figure 5:
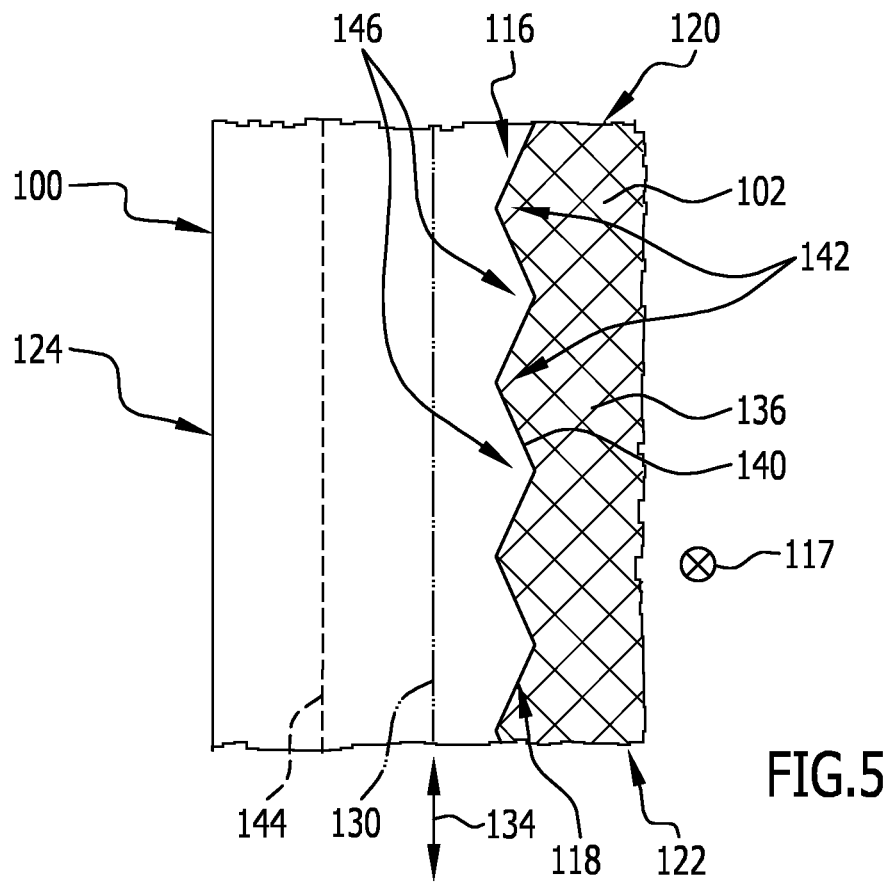
FIG. 5 shows a sectional plan view of a further assembly of a gas diffusion layer and a sealing element, which has been produced by means of a deformation delimiting element, the outer rim of which has a distance from an outside rim of the gas diffusion layer that varies linearly in sections along the peripheral direction of the gas diffusion layer.

The further assembly 120, shown in FIG. 5 in a sectional plan view, of a gas diffusion layer 102 and a sealing element 100 has been produced using a deformation delimiting element 132, the outer rim 138 of which has a distance from the outside rim 130 of the gas diffusion layer 102 that varies linearly in sections along the peripheral direction 134 of the gas diffusion layer 102.

Further, in this embodiment, the outer rim 138 of the deformation delimiting element 132 is always located between the outside rim 130 of the gas diffusion layer 102 and the pressing edge 114, such that in the finished assembly 120, the outside rim 130 of the gas diffusion layer 102 does not intersect the inside rim 140 of the connection region 116 of the sealing element 100, seen along the thickness direction 117 of the gas diffusion layer 102.

Figure 6:
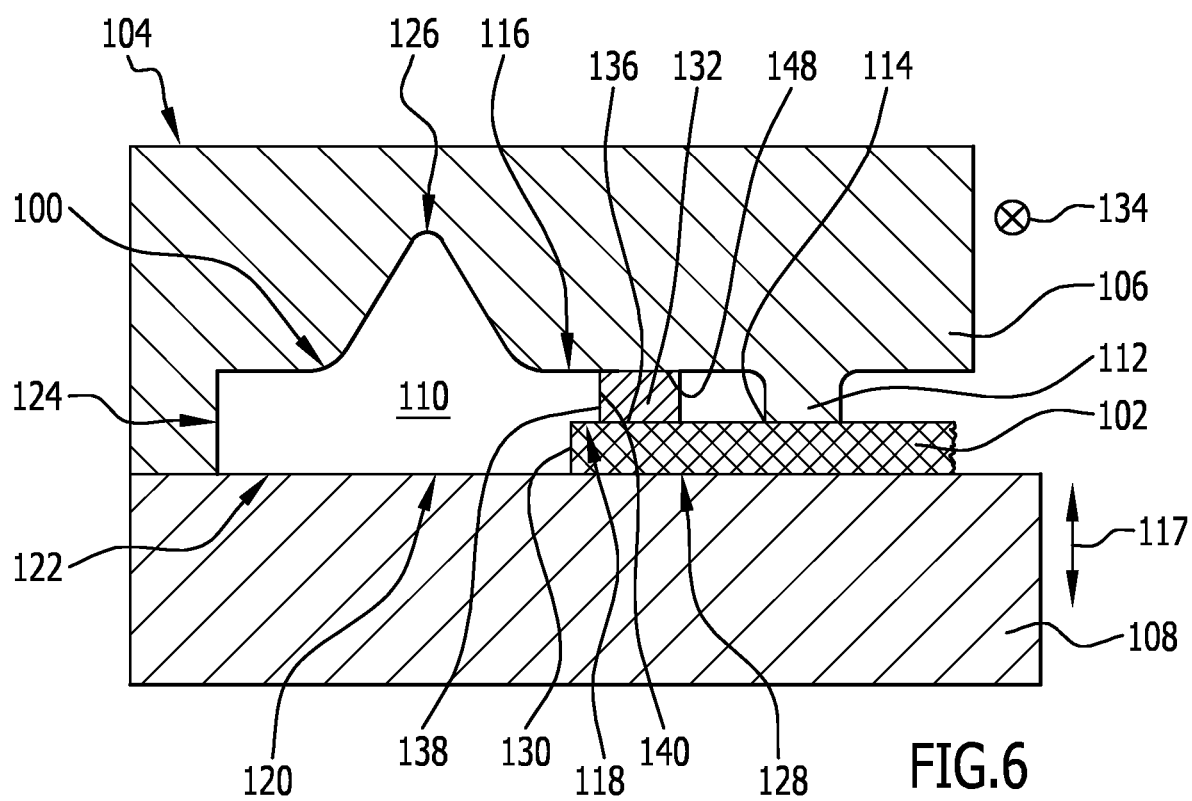
FIG. 6 shows a schematic section through an injection molding tool that comprises a plurality of deformation delimiting elements, which are spaced at a distance from each other along the peripheral direction of the gas diffusion layer, are spaced at a distance from a pressing projection of a pressing tool part of the injection molding tool, and contact the gas diffusion layer before the introduction of the injection molding material into the cavity of the injection molding tool.

In the alternative method, schematically depicted in FIG. 6, for producing the sealing element 100 on the gas diffusion layer 102, the injection molding tool 104 comprises a plurality of deformation delimiting elements 132, which are spaced at a distance from each other along the peripheral direction 134 of the gas diffusion layer 102, are spaced at a distance from the pressing edge 114 of the injection molding tool 104, and already contact the gas diffusion layer 102 before the introduction of the injection molding material into the cavity 110 of the injection molding tool 104.

Figure 7:
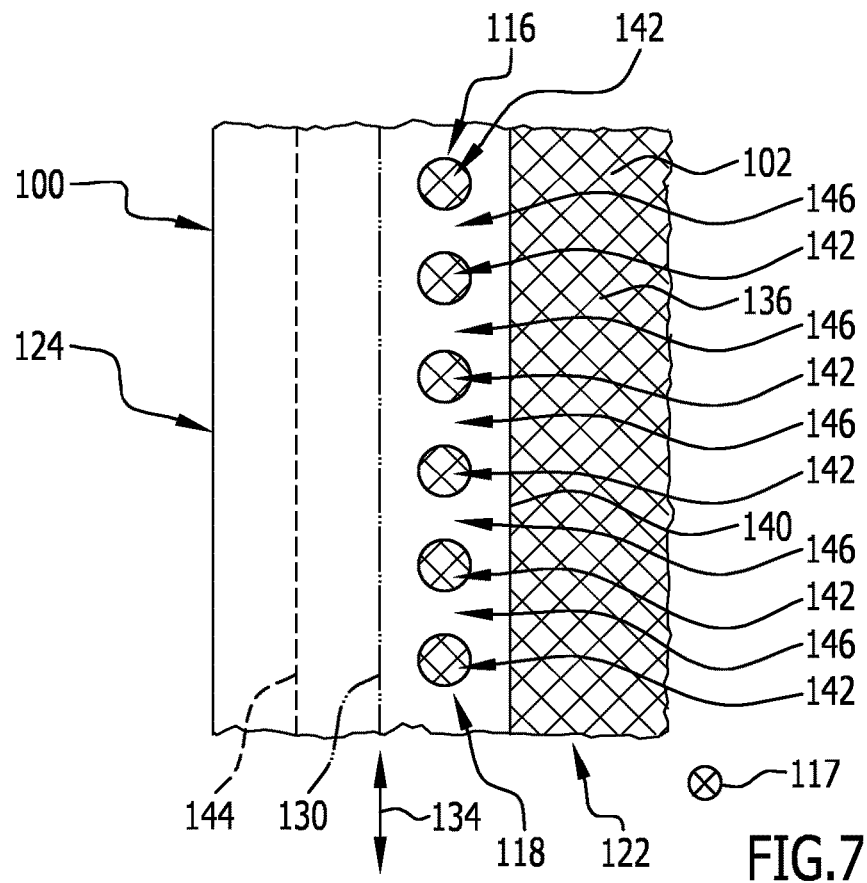
FIG. 7 shows a sectional plan view of an assembly of a gas diffusion layer and a sealing element that has been produced by means of the injection molding tool depicted in FIG. 6.

FIG. 7 shows a sectional plan view of an assembly 120 produced by means of the injection molding tool from FIG. 6.

The connection region 116 of the sealing element 100 of this assembly 120 is provided with recesses 142, which are arranged outward from the inside rim 140 of the connection region 116 and are spaced at a distance from each other in the peripheral direction 134 of the gas diffusion layer 102.

As can be seen in FIG. 7, the deformation delimiting elements 132 in this embodiment have, for example, a circular cross section, taken perpendicular to the thickness direction 117 of the gas diffusion layer 102, such that the recesses 142 in the connection region 116 also have a circular cross section.

In this embodiment, the deformation delimiting elements 132 are arranged between the outside rim 130 of the gas diffusion layer 102 and the pressing edge 114 of the injection molding tool 104, such that in the finished assembly 120, the outside rim 130 of the gas diffusion layer 102 does not intersect the recesses 124 in the connection region 116 of the sealing element 100, seen along the thickness direction 117 of the gas diffusion layer 102.

Figure 8:
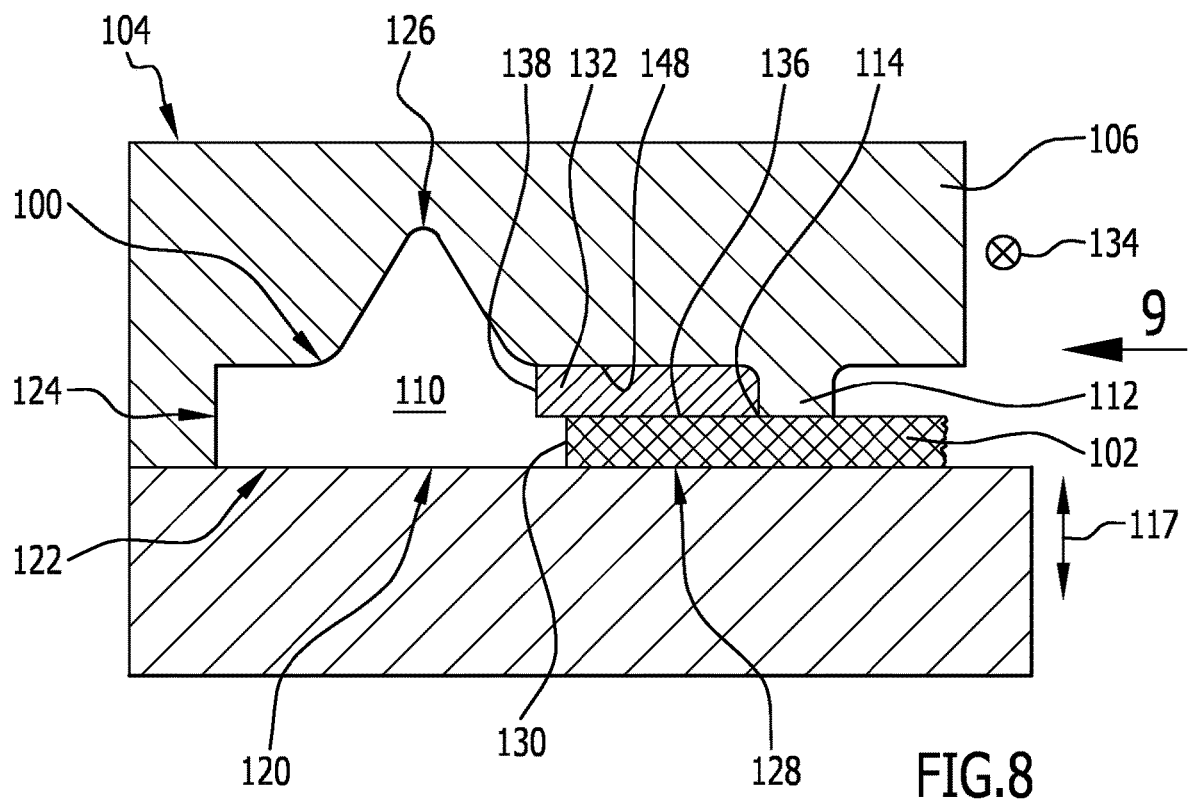
FIG. 8 shows a schematic section through an injection molding tool that comprises a deformation delimiting element, which has a height that varies in an undulating manner along the peripheral direction of the gas diffusion layer, wherein the deformation delimiting element has its maximum height in the cut plane of FIG. 8 and there contacts the gas diffusion layer before the introduction of the injection molding material into the cavity of the injection molding tool.

In an alternative method, schematically depicted in FIG. 8, for producing the sealing element 100 on the gas diffusion layer 102, the injection molding tool 104 comprises a deformation delimiting element 132, which has a height that varies in an undulating manner along the peripheral direction 134 of the gas diffusion layer 102.

In this case, the deformation delimiting element 132, in the cut plane of FIG. 8, has its maximum height, such that the deformation delimiting element 132 in this plane already contacts the gas diffusion layer 102 before the introduction of the injection molding material into the cavity 110 of the injection molding tool 104.

Figure 9:
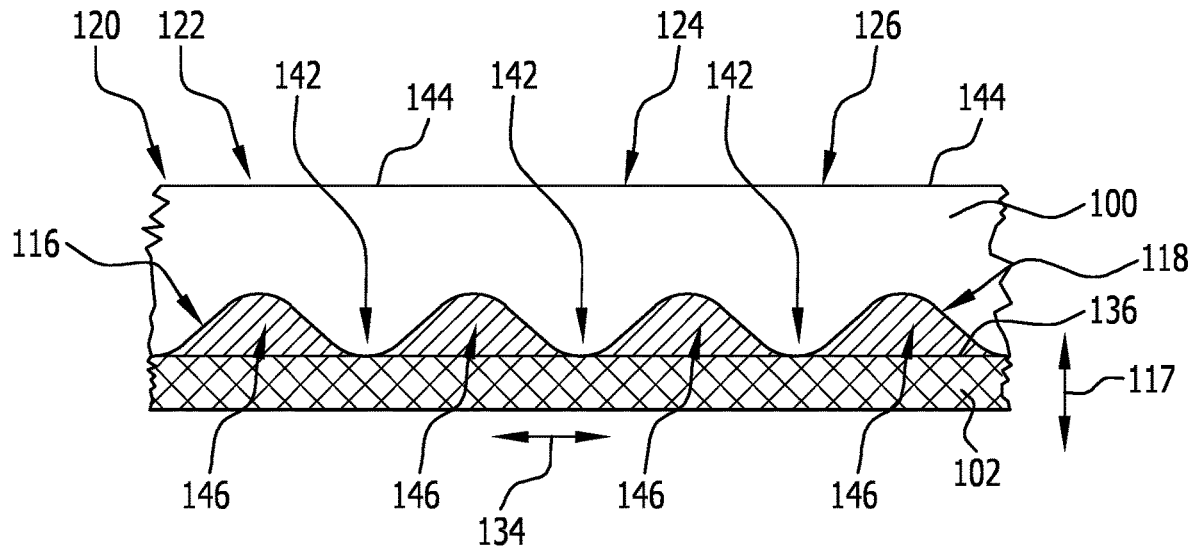
FIG. 9 shows a sectional side view of an assembly of a gas diffusion layer and a sealing element, which has been produced by means of the injection molding tool from FIG. 8, with the viewing direction in the direction of arrow 9 in FIG. 8.

The finished assembly 120 produced by means of the injection molding tool 104 from FIG. 8 is depicted in FIG. 9 in a sectional side view with the viewing direction in the direction of the arrow 9 in FIG. 8.

The connection region 116 of the sealing element 100 of this assembly 120 is provided with recesses 142 following one another along the peripheral direction 134 of the gas diffusion layer 102, said recesses 142 having a height (i.e., extent along the thickness direction 117 of the gas diffusion layer 102) that varies in an undulating manner.

These recesses 142 are separated from each other by stabilization regions 146 located therebetween, which also have a height that varies in an undulating manner and follow one another in the peripheral direction 134 of the gas diffusion layer 102.

Figure 10:
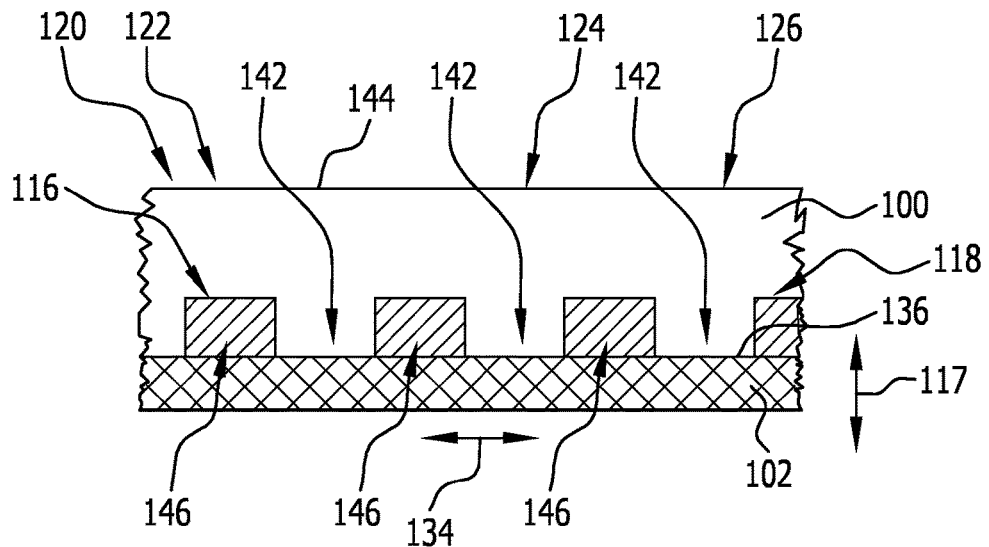
FIG. 10 shows a sectional side view, corresponding to FIG. 9, of an assembly of a gas diffusion layer and a sealing element, which sealing element has been produced by means of an injection molding tool that has a plurality of deformation delimiting elements following one another along the peripheral direction of the gas diffusion layer, a respective stabilization region of the sealing element being formed between two deformation delimiting elements following one another in the peripheral direction of the gas diffusion layer.

An alternative embodiment, depicted sectionally in FIG. 10, of an assembly 120 of a sealing element 100 and a gas diffusion layer 102 is produced by means of an injection molding tool 104, which, instead of a deformation delimiting element 132 with a variable height, comprises a plurality of deformation delimiting elements 132 that follow one another in the peripheral direction 134 of the gas diffusion layer 102 and are spaced at a distance from each other in the peripheral direction 134 of the gas diffusion layer 102, such that the connection region 116 of the finished sealing element 100 has stabilization regions 146 formed between the positions of the deformation delimiting elements 132.

The cross section, taken perpendicular to the thickness direction 117 of the gas diffusion layer 102, of the deformation delimiting elements 132 may, in principle, have any shape, for example a polygonal, in particular a quadrangular, for example a rectangular, shape or a shape with a curved rim line, for example an ellipse segment shape or a circle segment shape, in particular a semicircle shape.

Figure 11:
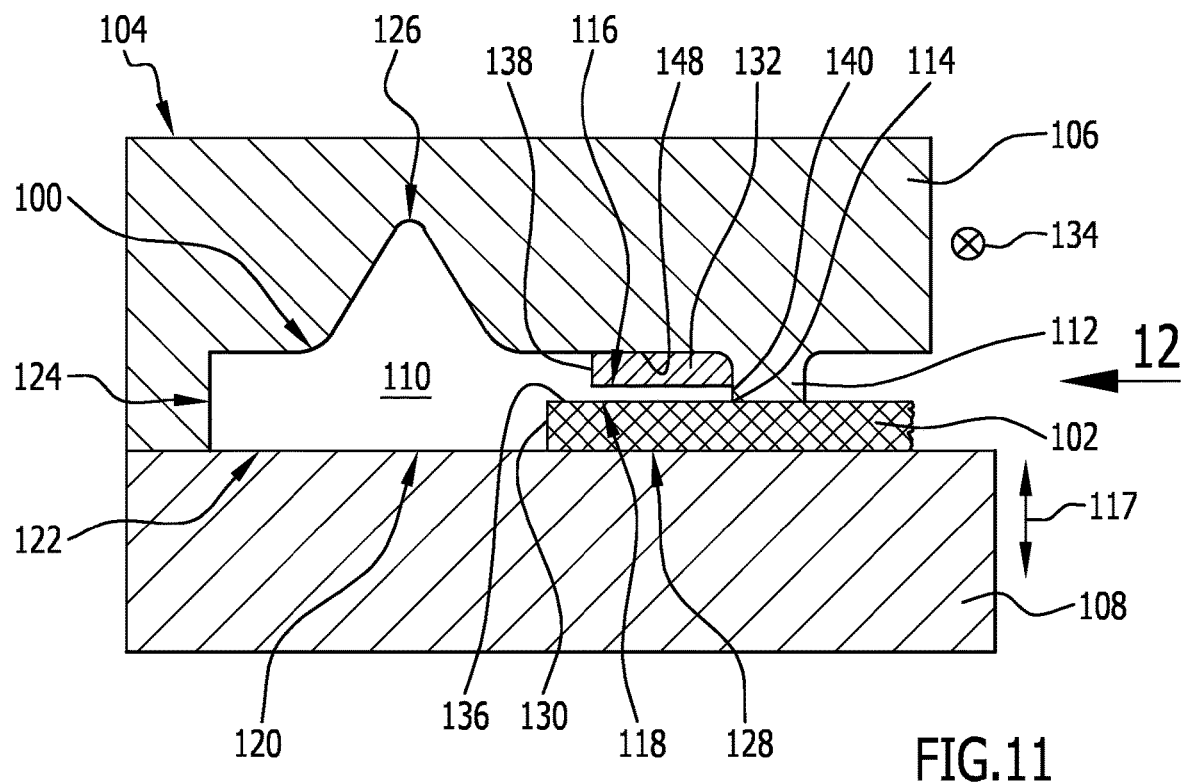
FIG. 11 shows a schematic section through an injection molding tool that comprises a deformation delimiting element, which has a height that varies in an undulating manner along the peripheral direction of the gas diffusion layer, wherein the maximum height of the deformation delimiting element is selected such that the deformation delimiting element does not contact the gas diffusion layer before the introduction of the injection molding material into the cavity of the injection molding tool.

In FIG. 11, a further embodiment of a method for producing the sealing element 100 on the gas diffusion layer 102 is schematically depicted, in which a deformation delimiting element 132 extending in the peripheral direction 134 of the gas diffusion layer 102 is used, said deformation delimiting element 132 abutting against the pressing projection 112 and against a delimiting wall 148 adjacent to the pressing projection 112 (said delimiting wall 148 preferably being oriented perpendicular to the thickness direction 117 of the gas diffusion layer 102) and having a height that varies, in particular in an undulating manner, along the peripheral direction 134 of the gas diffusion layer 102.

However, the maximum height of the deformation delimiting element 132 is thereby smaller than the distance between the delimiting wall 148 of the pressing tool part 106 on the one hand and the main face 136 of the gas diffusion layer 102 facing toward the delimiting wall 148 on the other hand, such that the deformation delimiting element 132 does not contact the gas diffusion layer 102 before the introduction of the injection molding material into the cavity 110 of the injection molding tool 104.

In this embodiment, an outer rim 138 of the deformation delimiting element 132 is arranged between the outside rim 130 of the gas diffusion layer 102 and the pressing edge 114, in a plan view of the gas diffusion layer 102 seen along the thickness direction 117 of the gas diffusion layer 102.

Figure 12:
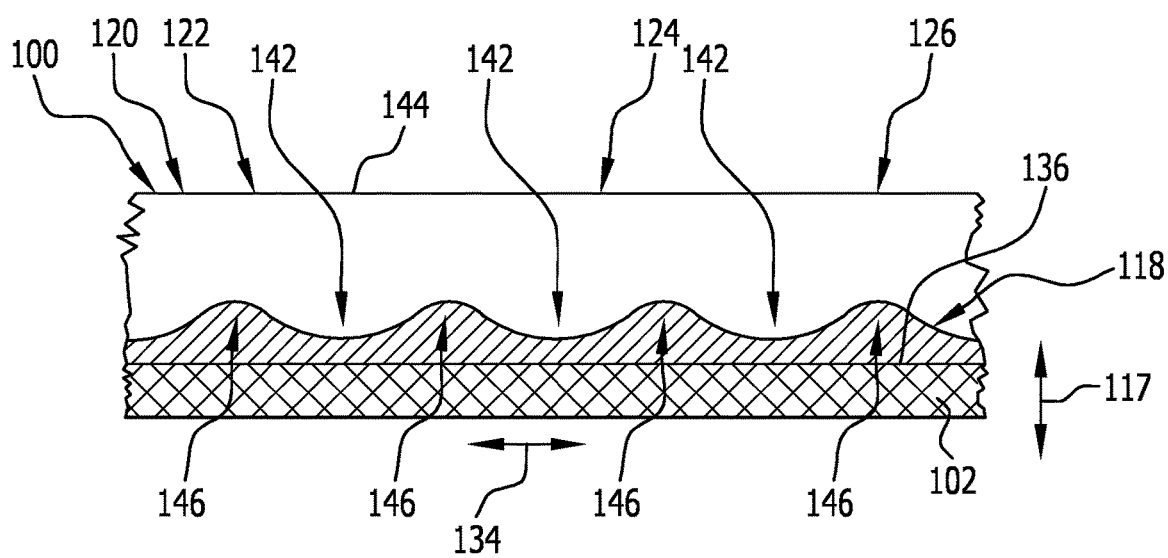
FIG. 12 shows a sectional side view of an assembly of a gas diffusion layer and a sealing element, which has been produced by means of the injection molding tool from FIG. 11, with the viewing direction in the direction of arrow 12 in FIG. 11.

The assembly 120, produced by means of the injection molding tool 104 depicted in FIG. 11, of the gas diffusion layer 102 and the sealing element 100 is depicted sectionally in FIG. 12.

Figure 13:
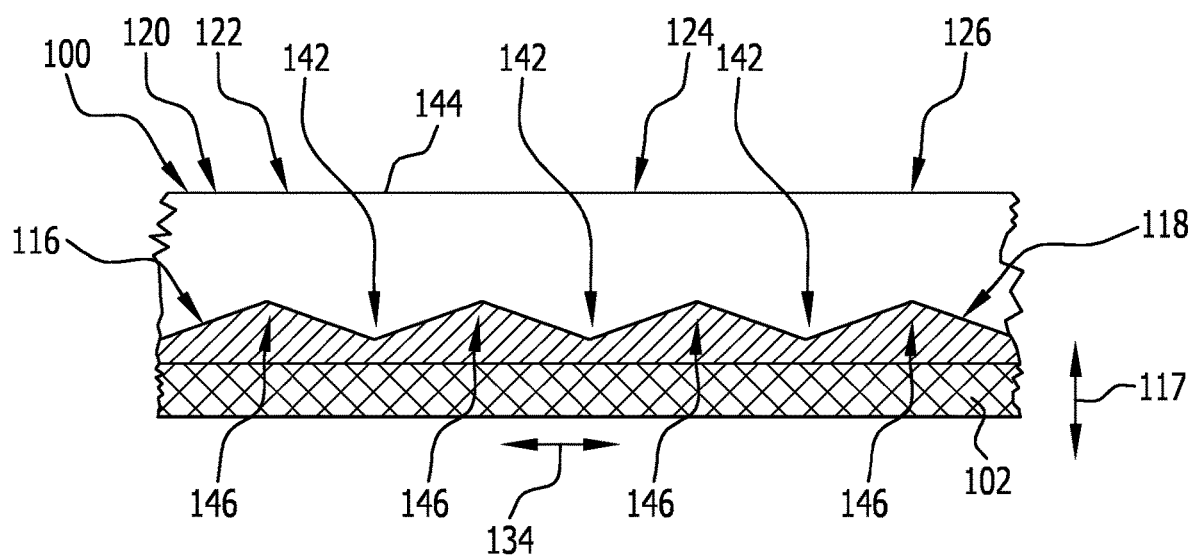
FIG. 13 shows a sectional side view of an assembly of a gas diffusion layer and a sealing element that has been produced by means of an injection molding tool, which comprises a deformation delimiting element that has a height that varies linearly in sections along the peripheral direction of the gas diffusion layer, the maximum height of the deformation delimiting element being selected such that the deformation delimiting element does not contact the gas diffusion layer before the introduction of the injection molding material into the cavity of the injection molding tool.

FIG. 13 shows a variant of the assembly from FIG. 12, which is produced using a deformation delimiting element 132, the height of which varies along the peripheral direction 134 not in an undulating manner, but rather linearly in sections, such that the connection region 116 of the sealing element 100 has a stabilization region 146 (formed complementarily to the deformation delimiting element 132), the height of which (i.e., the extent of which along the thickness direction 117 of the gas diffusion layer 102) varies linearly in sections.

Figure 14:
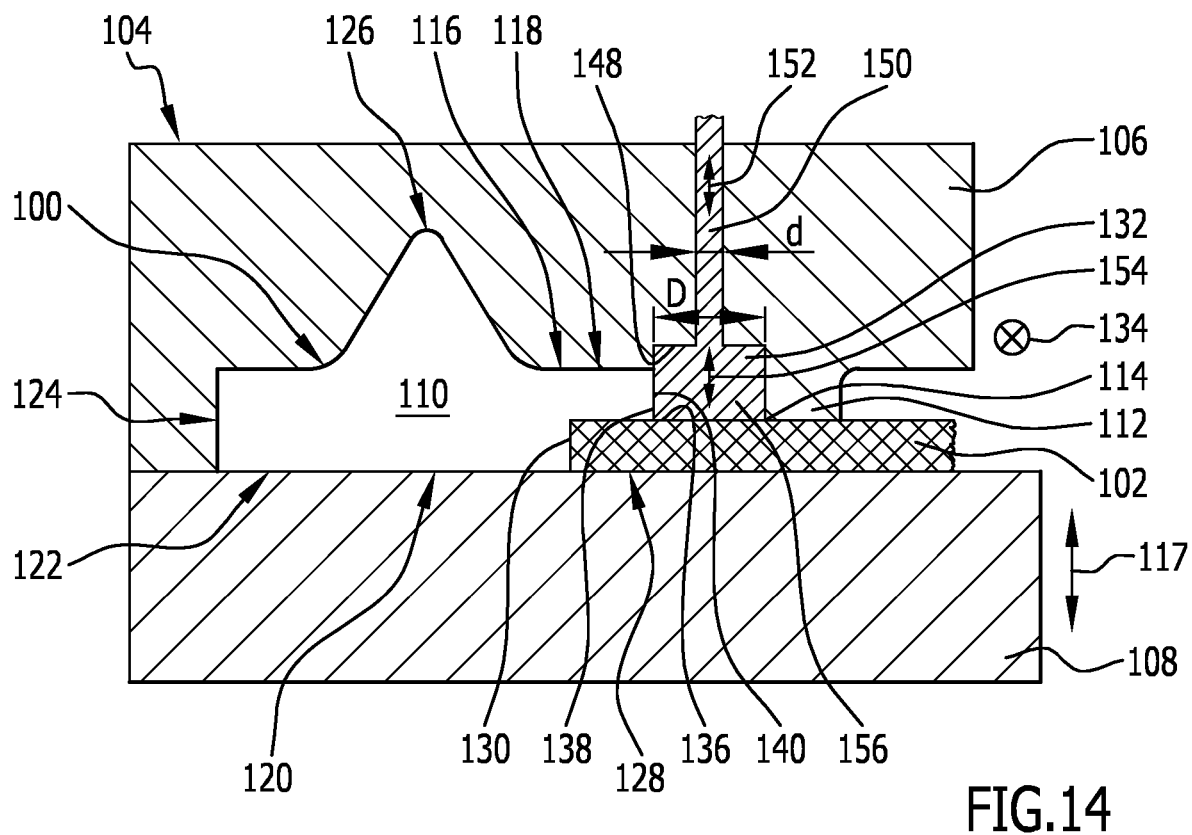
FIG. 14 shows a schematic section through an injection molding tool that has a plurality of deformation delimiting elements spaced at distance from each other in a peripheral direction of the gas diffusion layer, which deformation delimiting elements contact the gas diffusion layer before the introduction of the injection molding material into the cavity of the injection molding tool and are arranged on a pressing tool part so as to be moveable relative to the pressing tool part and are moved relative to the pressing tool after opening the injection molding tool in order to release the gas diffusion layer and the sealing element produced by injection molding from the pressing tool part, wherein the deformation delimiting elements are each coupled to a plunger that is displaceably guided on the pressing tool part and the plungers have a smaller extent in a direction oriented perpendicular to the displacement direction thereof than the respective deformation delimiting element coupled to the plunger.

In the alternative method, schematically depicted in FIG. 14, for producing the sealing element 100 on the gas diffusion layer 102, the injection molding tool 104 comprises a plurality of deformation delimiting elements 132, which are spaced at a distance from each other along the peripheral direction 134 of the gas diffusion layer 102 and each are coupled to a plunger 150, which is guided on the pressing tool part 106 of the injection molding tool 104 so as to be displaceable along a displacement direction 152.

The displacement direction 152, which corresponds to a movement direction 154 of the respectively associated deformation delimiting element 132, is preferably oriented substantially in parallel to the thickness direction 117 of the gas diffusion layer 102.

Each plunger 150 is coupled to a movement device (not depicted), by means of which a movement of the plunger 150 along the displacement direction 152 and thus a movement of the respectively associated deformation delimiting element 132 along the movement direction 154 is producible.

Before the introduction of the injection molding material into the cavity 110 of the injection molding tool 104, the deformation delimiting elements 132 that are moveable relative to the pushing tool part 106 are brought into the rest position depicted in FIG. 14, in which they delimit or prevent a deformation of the gas diffusion layer 102 during the introduction of the injection molding material into the cavity 110.

When the injection molding tool 104 is opened after completion of the injection molding operation by removing the supporting tool part 108 from the pressing tool part 106, the deformation delimiting elements 132 are moved, by actuating the movement device, relative to the pressing tool part 106 against the gas diffusion layer 102 and/or against the sealing element 100 produced by injection molding, such that the gas diffusion layer 102 and/or the sealing element 100 produced by injection molding is released from the pressing tool part 106.

In this embodiment, the deformation delimiting elements 132 thus act as ejectors 156 for ejecting the gas diffusion layer 102 and/or the sealing element 100 produced thereon by injection molding from the injection molding tool 104.

The movement tool may be configured, in particular, as a hydraulic movement device, a pneumatic movement device and/or an electromotive movement device.

The coupling between the plunger 150 and the respectively associated deformation delimiting element 132 may be produced e.g., by the plunger 150 being formed in one piece with the respectively associated deformation delimiting element 132.

The extent d of the plunger 150 in a direction oriented perpendicular to the displacement direction 152 and preferably perpendicular to the peripheral direction 134 of the gas diffusion layer 102 may be smaller than the extent D of the respectively associated deformation delimiting element 132 in the same direction, as depicted in FIG. 14.

In all other respects, the method schematically depicted in FIG. 14 corresponds with the method depicted in FIG. 2, such that reference may be made to the preceding description in that regard.

Figure 15:
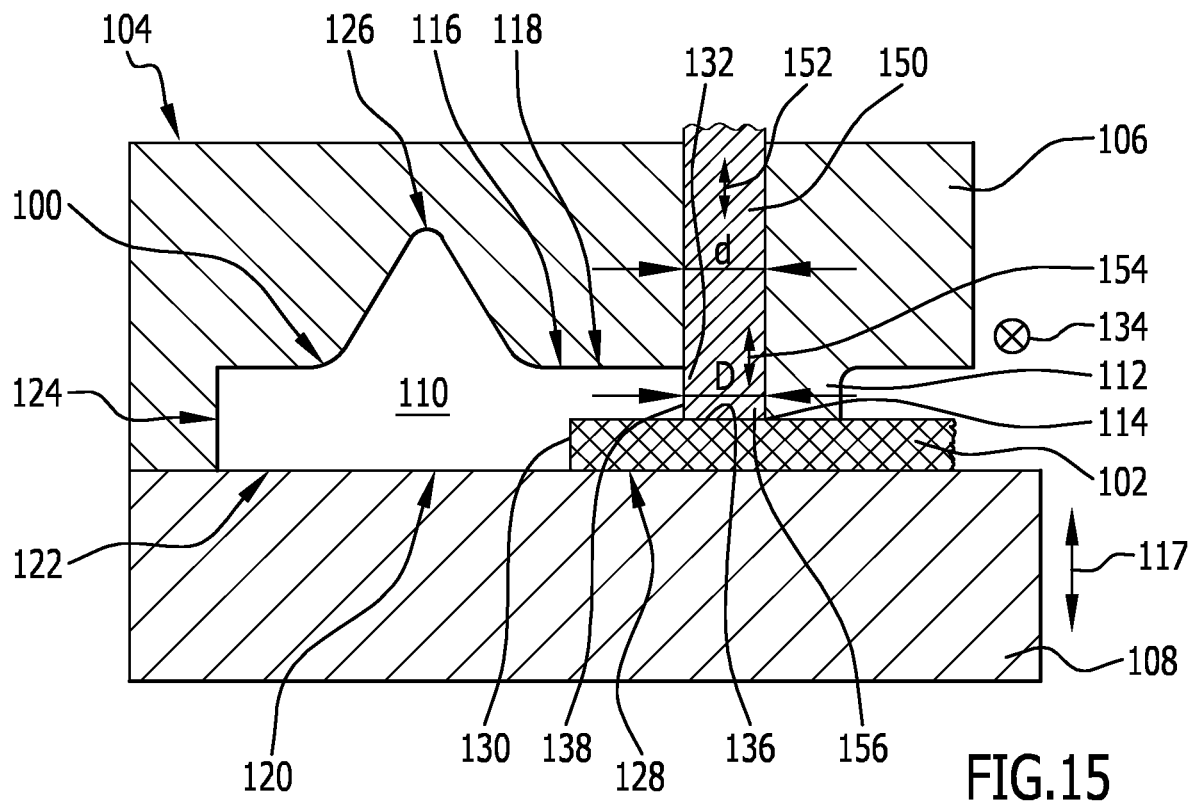
FIG. 15 shows a schematic section through a variant of the injection molding tool depicted in FIG. 14, in which the plunger has the same extent in a direction oriented perpendicular to its displacement direction as the respective deformation delimiting element coupled to the plunger.

An alternative method, depicted schematically in FIG. 15, for producing the sealing element 100 on the gas diffusion layer 102 differs from the method depicted in FIG. 14 in that the extent d of the plunger 150 perpendicular to its displacement direction 152 and preferably perpendicular to the peripheral direction 134 of the gas diffusion layer 102 is substantially equal to the extent D of the deformation delimiting element 132 coupled to the plunger 150 along the same direction.

In all other respects, the method schematically depicted in FIG. 15 corresponds with the method depicted in FIG. 14, such that reference may be made to the preceding description in that regard.

The invention claimed is:

1. A method for producing a sealing element on a gas diffusion layer of an electrochemical unit, the method comprising the following:
arranging an injection molding tool on the gas diffusion layer;
introducing injection molding material into a cavity of the injection molding tool;
wherein the injection molding tool comprises at least one deformation delimiting element, which delimits or prevents a deformation of the gas diffusion layer during the introduction of the injection molding material into the cavity, and
wherein an outer rim of the at least one deformation delimiting element has a distance from an outside rim of the gas diffusion layer that varies along a peripheral direction of the gas diffusion layer.

2. The method in accordance with claim 1, wherein the injection molding tool comprises at least one pressing tool part that has a pressing projection for pressing the gas diffusion layer.

3. The method in accordance with claim 2, wherein the deformation delimiting element is formed separate from the pressing tool part.

4. The method in accordance with claim 3, wherein the deformation delimiting element is in contact with the pressing projection of the pressing tool part during the introduction of the injection molding material into the cavity of the injection molding tool.

5. The method in accordance with claim 3, wherein the deformation delimiting element is at a distance from the pressing projection of the pressing tool part during the introduction of the injection molding material into the cavity of the injection molding tool.

6. The method in accordance with claim 1, wherein the deformation delimiting element is arranged above or below a penetration region of the gas diffusion layer in a thickness direction of the gas diffusion layer, said penetration region being penetrated by the injection molding material during the introduction of the injection molding material into the cavity.

7. The method in accordance with claim 1, wherein the deformation delimiting element contacts the gas diffusion layer before the introduction of the injection molding material into the cavity of the injection molding tool.

8. The method in accordance with claim 1, wherein the deformation delimiting element is at a distance from the gas diffusion layer before the introduction of the injection molding material into the cavity of the injection molding tool.

9. The method in accordance with claim 1, wherein a plurality of deformation delimiting elements are provided, which are spaced at a distance from each other along a peripheral direction of the gas diffusion layer.

10. The method in accordance with claim 1, wherein at least one deformation delimiting element is provided, which has a height that varies along a peripheral direction of the gas diffusion layer.

11. The method in accordance with claim 1, wherein at least one deformation delimiting element is arranged on a part of the injection molding tool so as to be moveable relative to the respective part of the injection molding tool and is moved relative to the respective part of the injection molding tool in order to release the gas diffusion layer and/or the sealing element produced by injection molding from the respective part of the injection molding tool.

12. The method in accordance with claim 1, wherein at least one deformation delimiting element projects beyond an outside rim of the gas diffusion layer.

* * * * *